United States Patent [19]
Lotspih et al.

[11] Patent Number: 5,788,267
[45] Date of Patent: *Aug. 4, 1998

[54] AIR BAG MODULE WITH INFLATOR RETENTION

[75] Inventors: John Anthony Lotspih, Englewood; James Lloyd Webber, Centerville, both of Ohio

[73] Assignee: General Motors Corporation, Detroit, Mich.

[ * ] Notice: The term of this patent shall not extend beyond the expiration date of Pat. No. 5,588,675.

[21] Appl. No.: 725,416

[22] Filed: Oct. 3, 1996

Related U.S. Application Data

[62] Division of Ser. No. 491,807, Jun. 19, 1995, Pat. No. 5,588,675, which is a division of Ser. No. 169,124, Dec. 20, 1993, abandoned.

[51] Int. Cl.$^6$ .................................................... B60R 21/20
[52] U.S. Cl. ........................ 280/728.2; 280/732; 411/525
[58] Field of Search .......................... 280/728.2, 732, 280/736, 741, 728.1; 403/105; 411/525, 526, 527, 522, 338, 339

[56] References Cited

U.S. PATENT DOCUMENTS

| | | | |
|---|---|---|---|
| 2,236,929 | 4/1941 | Tinnerman | 411/527 |
| 2,318,640 | 5/1943 | Simmonds | 411/527 |
| 2,342,312 | 2/1944 | Tinnerman | 411/527 |
| 2,355,485 | 8/1944 | Tinnerman | 411/527 |
| 2,535,879 | 12/1950 | Tinnerman | 411/525 |
| 3,909,037 | 9/1975 | Stewart | 280/738 |
| 3,910,595 | 10/1975 | Katter et al. | 280/732 |
| 3,938,826 | 2/1976 | Giorgini et al. | 280/738 |
| 4,153,273 | 5/1979 | Risko | 280/740 |
| 4,817,828 | 4/1989 | Goetz | 280/736 |
| 4,842,300 | 6/1989 | Ziomek et al. | 280/732 |
| 4,846,368 | 7/1989 | Goetz | 280/736 |
| 4,964,654 | 10/1990 | Bishop et al. | 280/728.2 |
| 5,226,670 | 7/1993 | Wright et al. | 280/738 |
| 5,234,227 | 8/1993 | Webber | 280/732 |
| 5,263,739 | 11/1993 | Webber et al. | 280/728.2 |
| 5,326,131 | 7/1994 | Yokota et al. | 280/728.2 |
| 5,328,203 | 7/1994 | Baba et al. | 280/728.2 |
| 5,332,259 | 7/1994 | Conlee et al. | 280/738 |
| 5,498,025 | 3/1996 | Easter et al. | 280/728.2 |
| 5,687,988 | 11/1997 | Storey et al. | 280/728.2 |

FOREIGN PATENT DOCUMENTS

627342-A1  6/1993  European Pat. Off. .

Primary Examiner—Peter C. English
Attorney, Agent, or Firm—Kathryn A. Marra

[57] ABSTRACT

An air bag module includes an air bag and a container including spaced apart end walls. An elongated inflator extends between the end walls for discharging gas to inflate the air bag. A lug projects outwardly from an inflator end of the inflator and the lug engages one of the end walls of the container. First and second opposing spring tabs are included on the one end wall of the container. The spring tabs each include a retention end which are spaced apart from each other and define a retention opening therebetween which is narrower than the lug on the inflator end. Upon insertion of the lug into the retention opening, the lug engages the retention ends of the spring tabs and deflects the spring tabs such that the retention ends of the spring tabs each grip against the lug to cooperatively capture the lug between spring tabs and prevent removal of the inflator from the container.

9 Claims, 8 Drawing Sheets

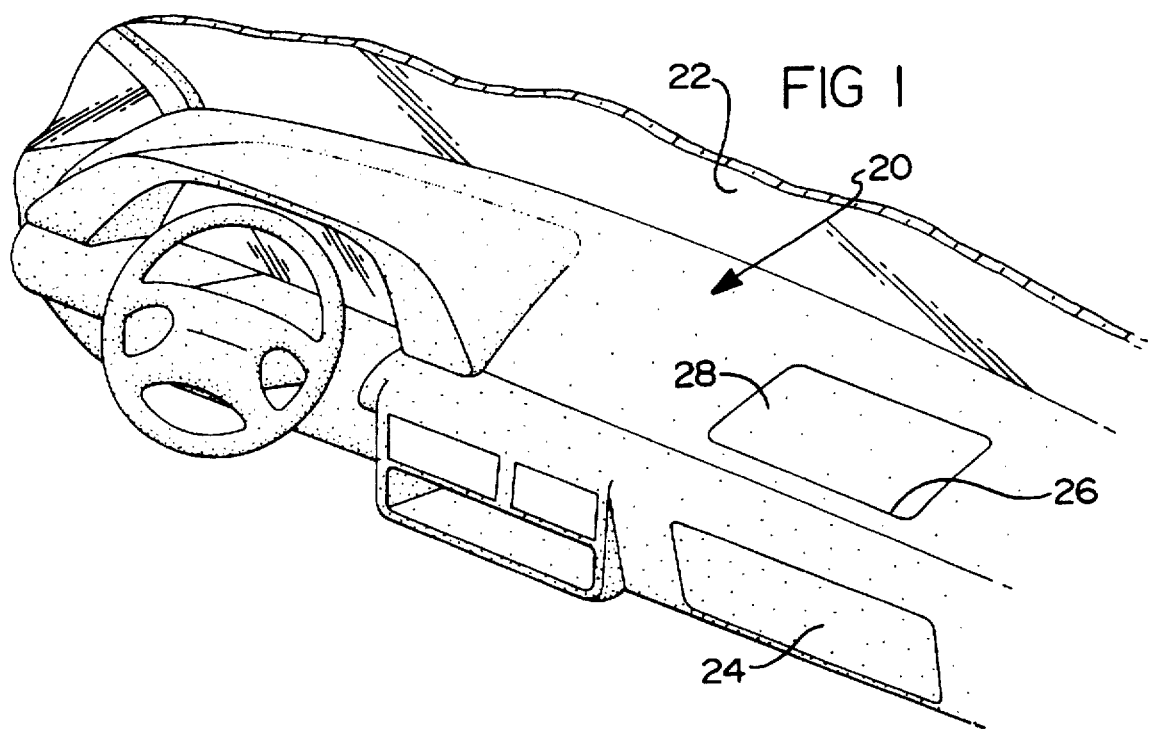
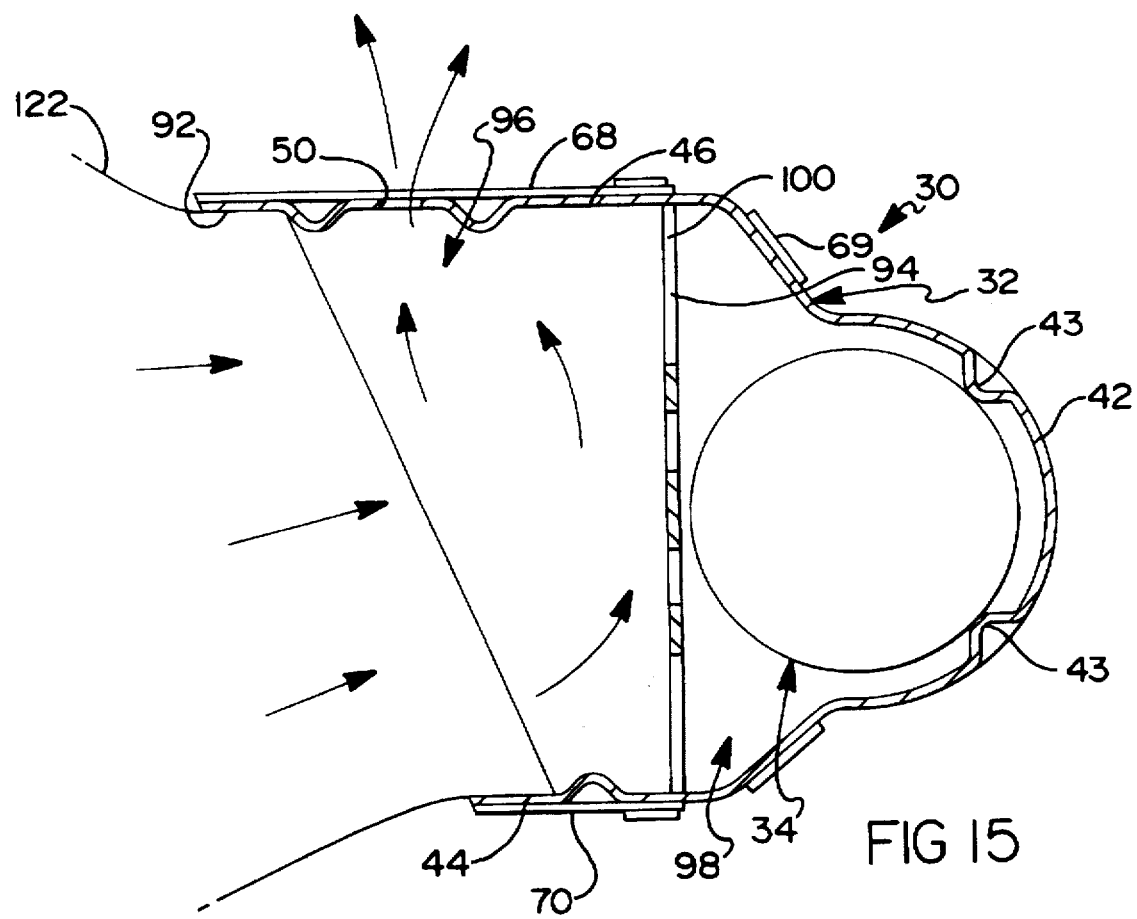

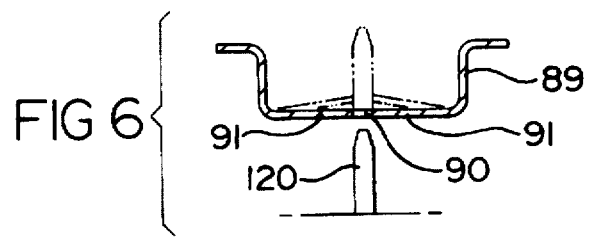
FIG 6
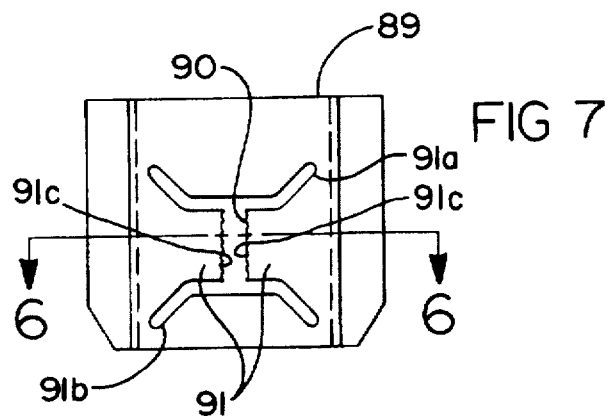
FIG 7
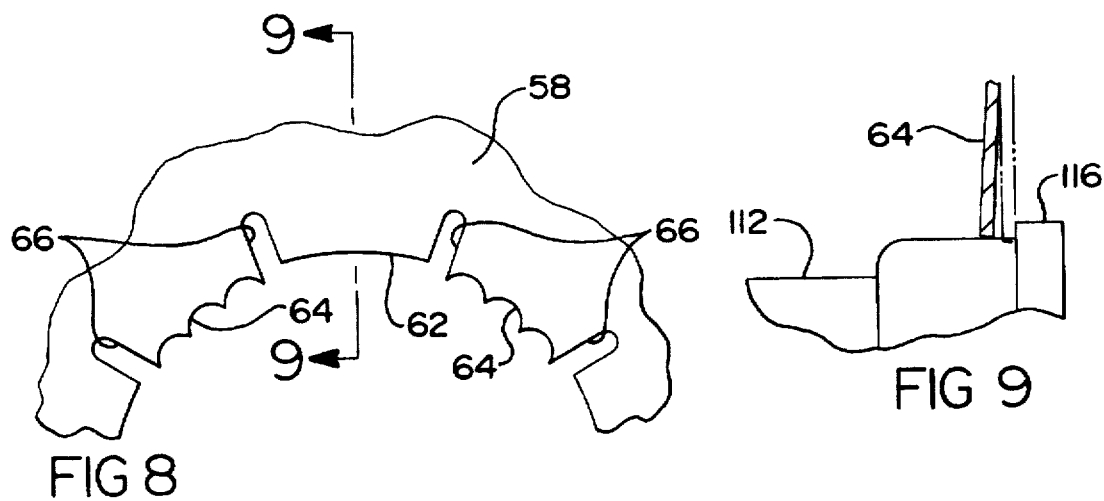
FIG 8
FIG 9

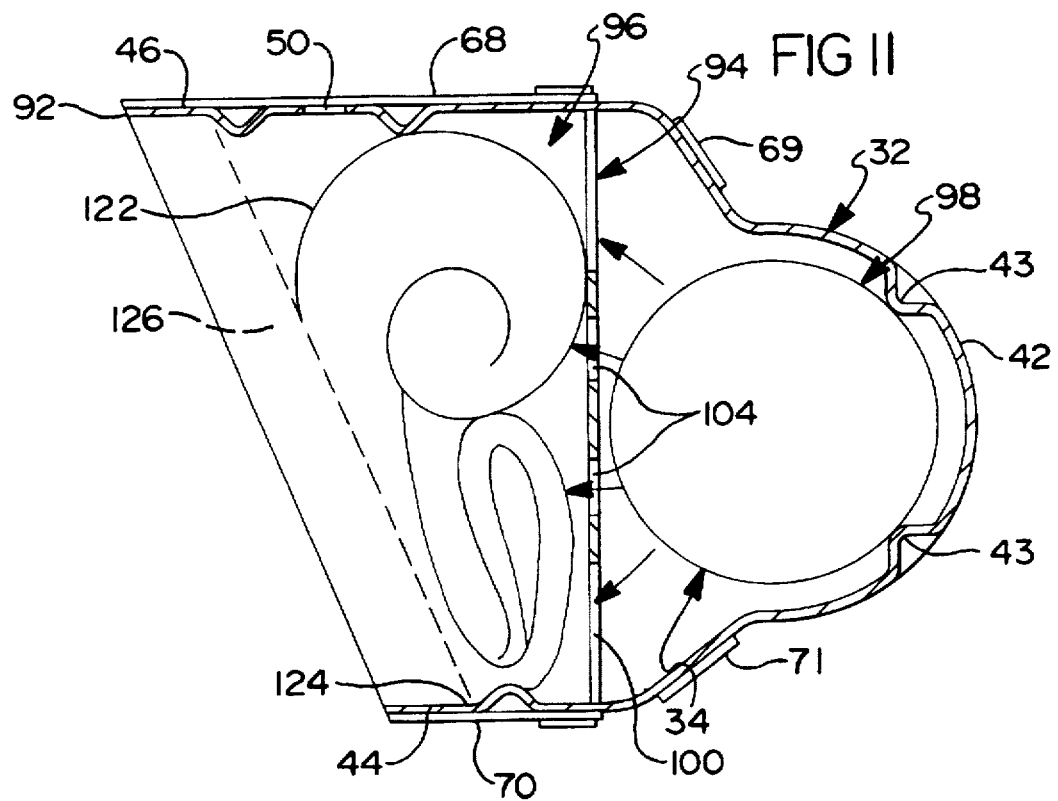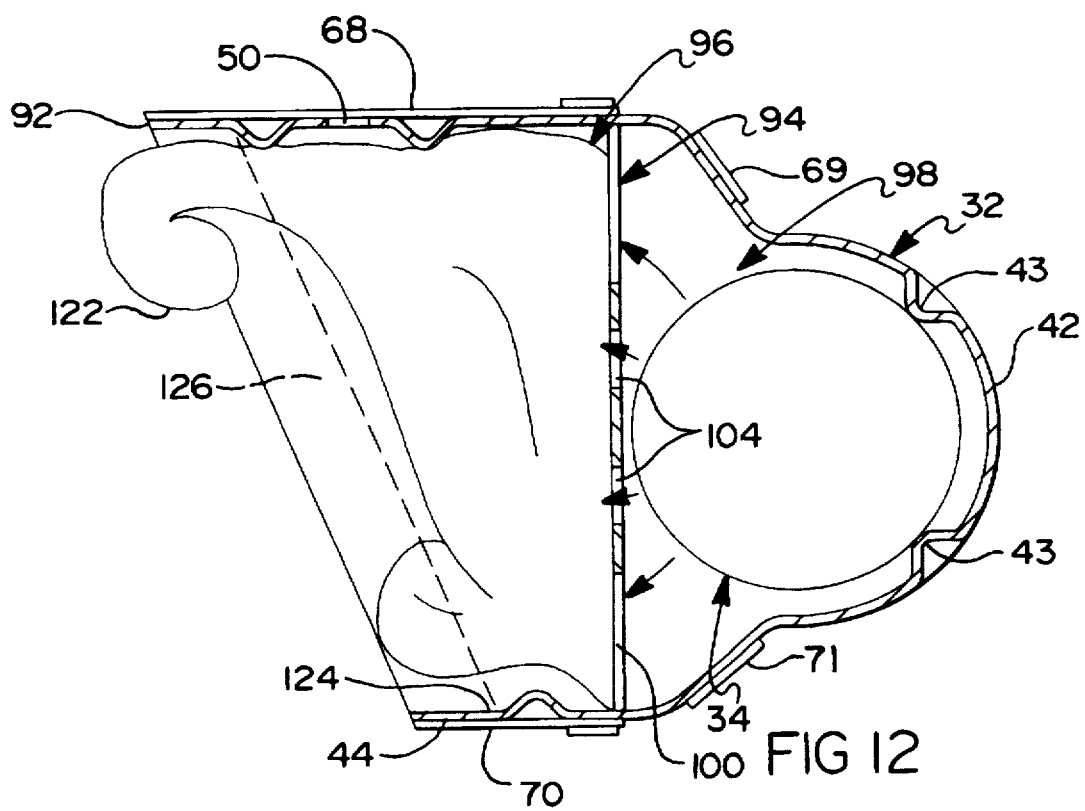

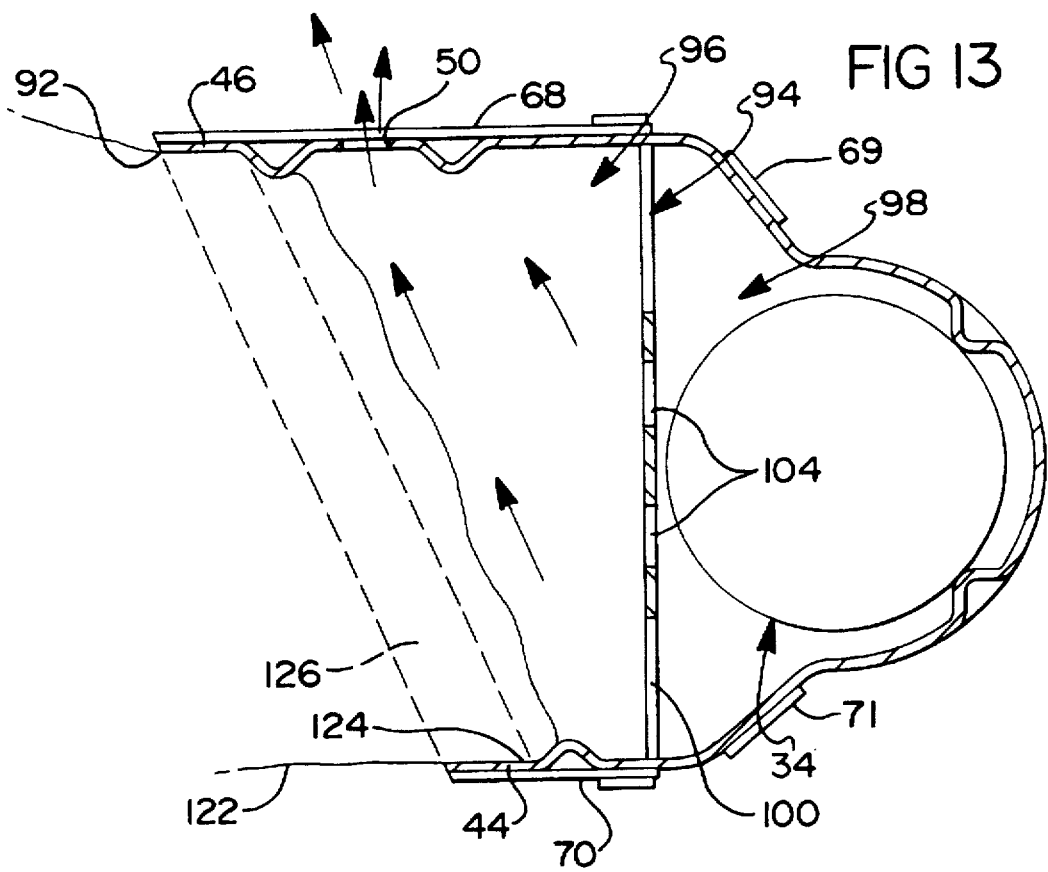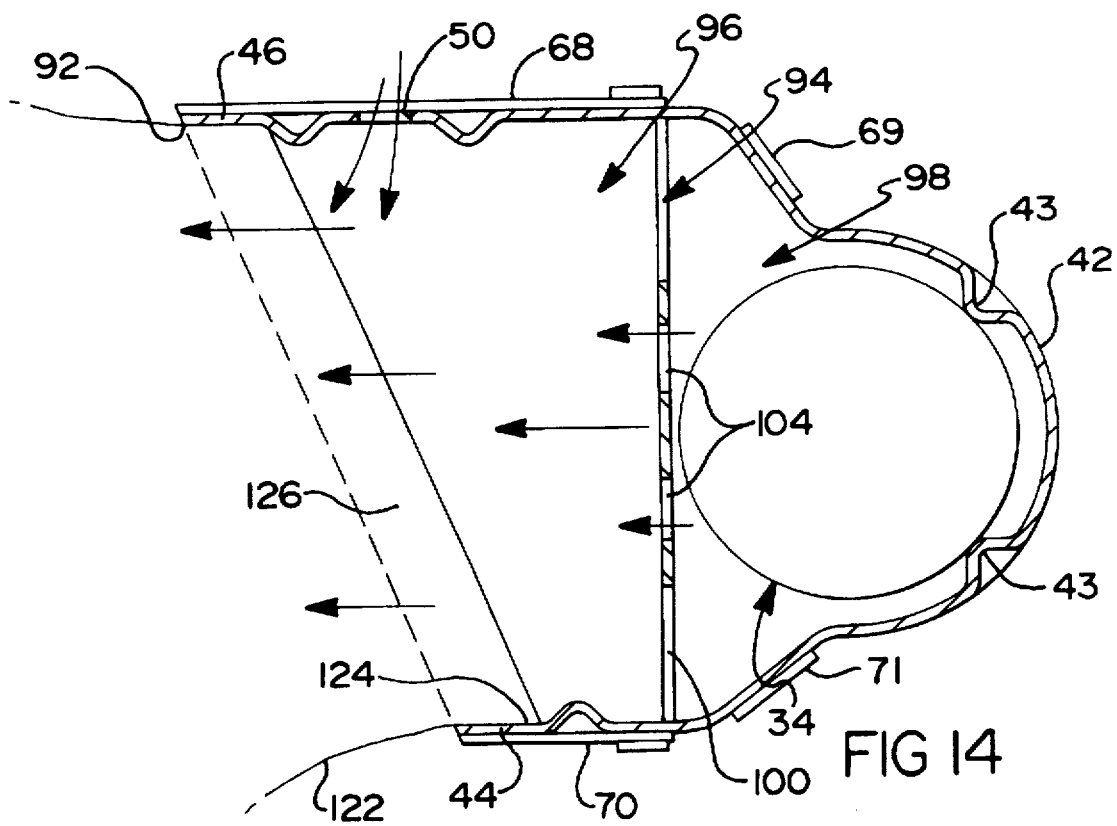

5,788,267

AIR BAG MODULE WITH INFLATOR RETENTION

This application is a divisional application of U.S. Ser. No. 08/491,807 filed on Jun. 19, 1995, U.S. Pat. No. 5,588,675, which is a divisional application of U.S. Ser. No. 08/169,124 filed on Dec. 20, 1993, now abandoned, both assigned to the assignee of this invention.

BACKGROUND OF THE INVENTION

This invention relates generally to air bag modules for installation in passenger vehicles and, more particularly, to an inflatable air bag module having means for augmenting gas delivered from an inflator to an air bag.

Many passenger vehicles manufactured today are equipped with air bags for the front seat passenger. This air bag is part of an air bag module which includes an inflator attached to the air bag and a container for housing the air bag and the inflator.

This air bag module is located in a recess in the vehicle instrument panel for deployment of the air bag through an instrument panel opening which is normally closed by a cover door. The inflator is actuated by a signal received from a vehicle deceleration sensor to discharge pressure gas through discharge ports into the air bag interior. Upon inflation, the air bag forces the cover door open and deploys into the passenger compartment rearwardly of the instrument panel.

Inflators utilized in this type of installation generally have a cylindrical outer casing. The container has a U-shaped bottom portion, comprising part-cylindrical bottom and side walls which house the inflator. The container has a top opening that connects to the air bag interior. The inflators are conventionally assembled to the container by assuring proper orientation and then applying fasteners, such as nuts and bolts.

Various types of cylindrical inflators are used in this arrangement. In one, the canister is mounted on the bottom wall and gas discharge ports are located on only the top side of the inflator facing the air bag opening. This type is known as a directional inflator and is characterized by having a downward resultant reaction force on the module when actuated.

Another type of inflator features gas discharge ports located on diametrically-opposite sides of the casing. This arrangement of the discharge ports makes the inflator thrust neutral, since the gas discharge forces on opposite sides of the inflator cancel, with no resultant forces on the module.

With either type of inflator, it is important to quickly inflate the air bag to provide occupant cushioning. Quicker filling can be accomplished by using an inflator which generates more gas quickly. However, this involves use of a larger and heavier inflator. Another solution is to aspirate ambient air during air bag inflation to supplement the inflator-generated gas with air to increase output to more quickly fully inflate the air bag.

An inflator arrangement for increasing gas output is illustrated in U.S. Pat. No. 4,846,368—Goetz in which a directed thrust inflator is used in an inflator container, or reaction canister, having holes in its side walls. These holes are normally covered by flexible flaps. Upon actuation of the inflator, the discharge of pressure gas from the canister causes a pressure reduction around the sides of the canister, due to the Bernoulli effect. This resultant pressure imbalance forces the flaps inwardly to aspirate ambient air to the canister. This supplemental ambient air augments the gas discharged by the inflator, increasing the total gas volume available to inflate the deploying air bag.

A similar arrangement is shown in U.S. Pat. No. 4,928,991—Thorn which also utilizes directed thrust gas generation and side wall aspiration holes covered by a flap. In both of these patents, an increase in air bag pressure causes the flaps to close. This requires other means of accommodating pressure increases.

As gas pressure rises upon occupant engagement in the Goetz arrangement, these flexible flaps will close to prevent exhaust of gas through these holes. To reduce gas pressure, auxiliary rear vent holes are provided. These are covered with a foil that ruptures to vent the gas to reduce air bag pressure.

It would be desirable to provide a simplified air bag module which uses a directional inflator that enables the augmentation of discharge gas by aspiration of ambient air.

It would also be desirable to provide an air bag module of simplified construction which provides relief for excessive air bag pressure.

It would be further desirable to provide an air bag module which supplies initial high air bag pressure to initiate air bag breakout immediately followed by a momentary pressure reduction to reduce the breakout forces, followed by aspiration to augment discharge gas during air bag deployment.

It would be yet further desirable to provide an inflator mounting which is quick, assures proper inflator orientation, and eliminates separate fasteners.

SUMMARY OF THE INVENTION

It is an object of this invention to provide an inflator mounting which is quick, assures proper inflator orientation, and eliminates separate fasteners.

This invention features an air bag module including an air bag deployable in a vehicle for engagement by a vehicle occupant, a generally cylindrical inflator having a body with gas discharge holes along one side for discharging gas to inflate the air bag and having a projecting lug extending from one end, a generally rectangular container comprising elongated side walls, a bottom wall and end walls interconnecting the side walls and defining an upper air bag deployment opening and a lower gas transfer opening. One of the container end walls includes a lower opening for receiving the inflator and at least one retention finger projecting into the opening. The other end wall includes a retention aperture for receiving the inflator lug and at least one retention tab projecting into said aperture. The inflator is mounted in the container by inserting the inflator one end through the opening until the lug enters the aperture. The inflator is retained by the lug deforming the retention tab which engages and retains the lug against removal, and by the retention finger engaging the inflator body adjacent its other end against removal from the container.

Preferably, the inflator lug and the retention aperture are complementarily shaped to locate the inflator in a predetermined orientation in the container upon assembly.

This is accomplished in the present invention by providing an air bag module including an air bag and a container including spaced apart end walls. An elongated inflator extends between the end walls for discharging gas to inflate the air bag. A lug projects outwardly from an inflator end of the inflator and the lug engages one of the end walls of the container. First and second opposing spring tabs are included on the one end wall of the container. The spring tabs each include a retention end which are spaced apart from each other and define a retention opening therebetween which is narrower than the lug on the inflator end. Upon insertion of the lug into the retention opening, the lug engages the retention ends of the spring tabs and deflects the spring tabs such that the retention ends of the spring tabs each grip against the lug to cooperatively capture the lug between spring tabs and prevent removal of the inflator from the container.

BRIEF DESCRIPTION OF THE DRAWINGS

These and further objects and features of this invention will become more readily apparent upon reference to the following detailed description of a preferred embodiment, as illustrated in the accompanying drawings, in which:

FIG. 1 is a perspective view of a portion of a passenger vehicle which mounts an air bag module according to this invention behind the instrument panel;

FIG. 6 is a sectional view which is generally taken along line 6—6 of FIG. 7; but which further includes an inflator lug.

FIG. 7 is an enlarged detail view of a container retention tab according to this invention;

FIG. 8 is an enlarged detail view of a retention tab for retaining the inflator according to this invention;

FIG. 9 is a sectional view which is generally taken along line 9—9 of FIG. 8; but which further includes the inflator.

FIGS. 11–15 are simplified sectional views similar to FIG. 10, sequentially illustrating operation of the air bag.

DETAILED DESCRIPTION OF THE PREFERRED EMBODIMENT

Figure 2:
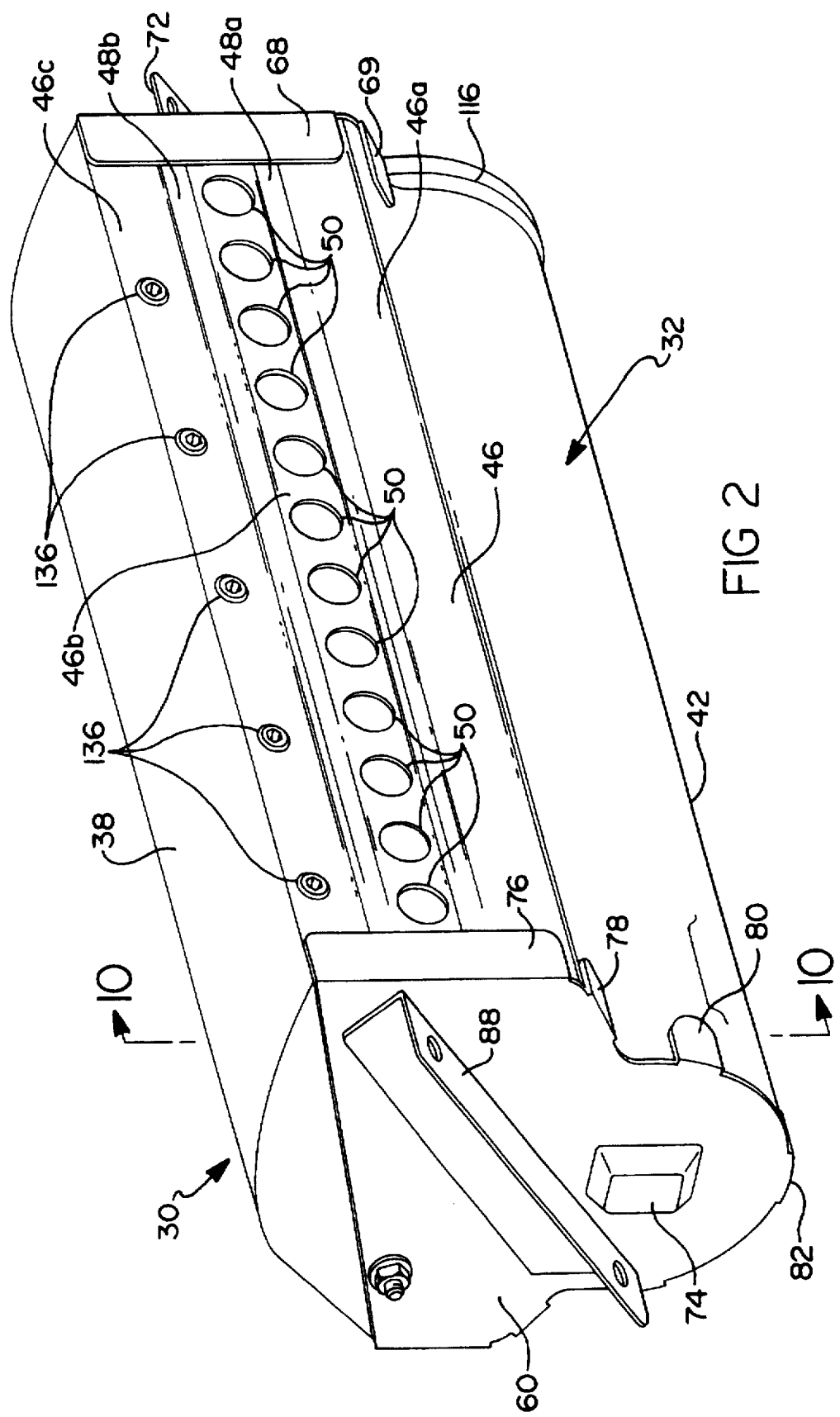
FIG. 2 is a perspective view of an air bag module according to this invention.

Referring to FIG. 1 of the drawings, a passenger vehicle includes an instrument panel 20 mounted in the vehicle interior behind a windshield 22. Panel 20 includes the usual glove box which is closed by a glove box door 24. An air bag deployment opening 26 formed in the top of panel 20 above glove box door 24. Opening 26 is normally closed by a cover door 28. Cover door 28 is of similar construction as instrument panel 20 so as to form a continuation of it, although being separate and separable from it.

Figure 3:
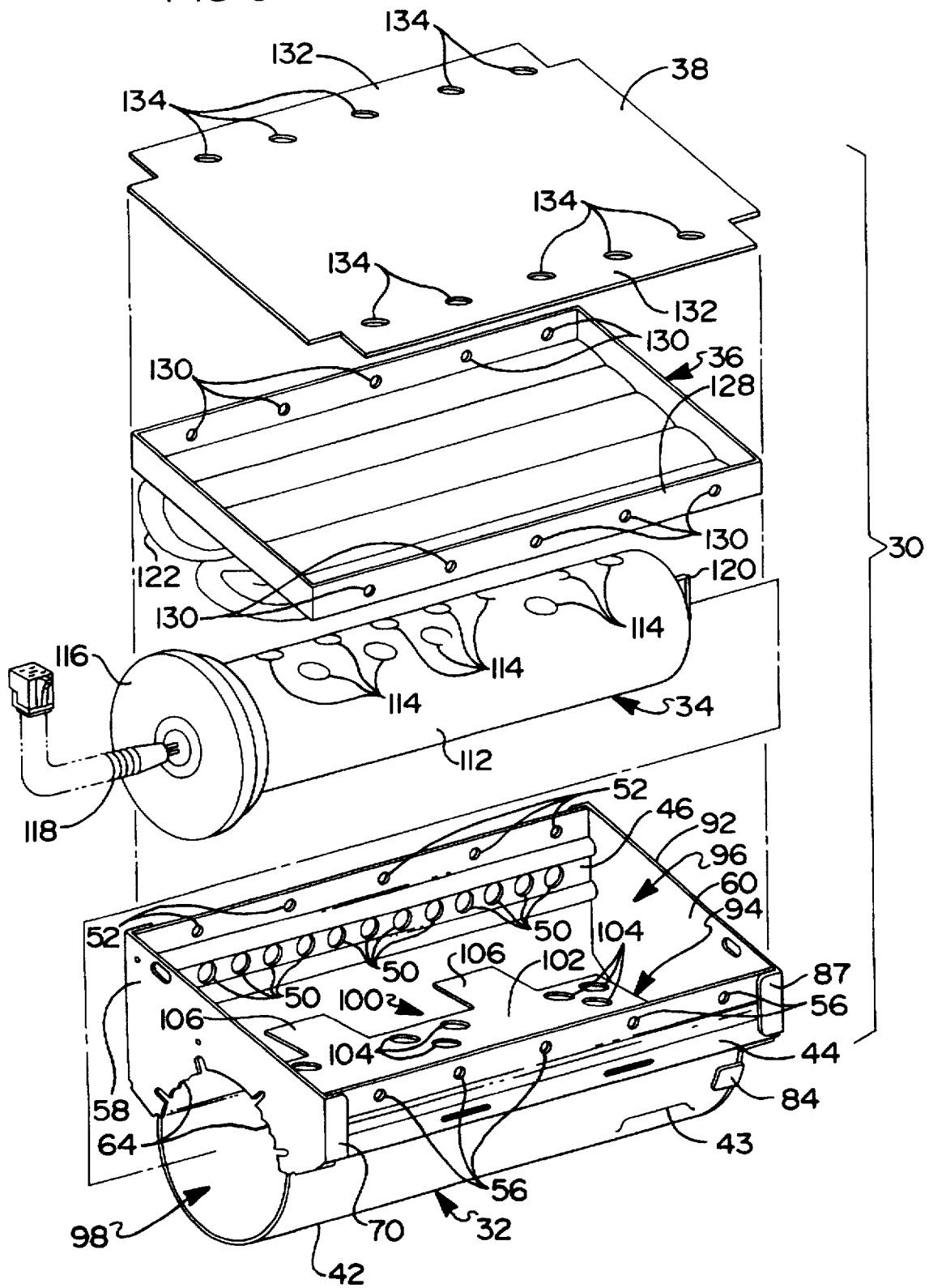
FIG. 3 is an exploded perspective view of the air bag module of FIG. 2.

Located beneath opening 26 is an air bag module 30 illustrated in FIGS. 2 and 3. Module 30 includes a steel container 32, a generally cylindrical aluminum inflator 34, an air bag assembly 36, and a dust cover 38. As assembled, container 32 houses both inflator 34 and air bag assembly 36.

Figure 4:
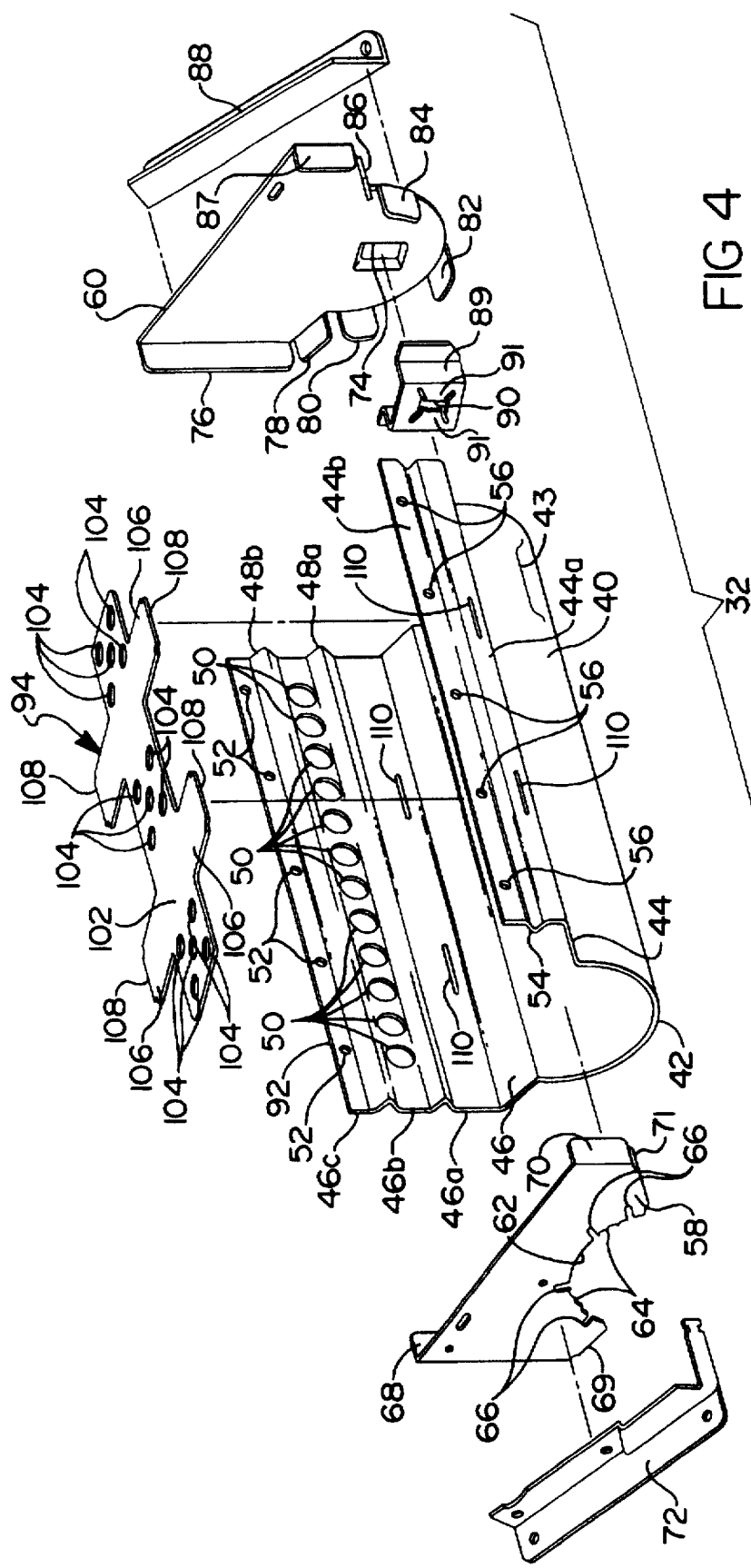
FIG. 4 is an exploded perspective view of the container used in the air bag module of FIGS. 2 and 3.
Figure 10:
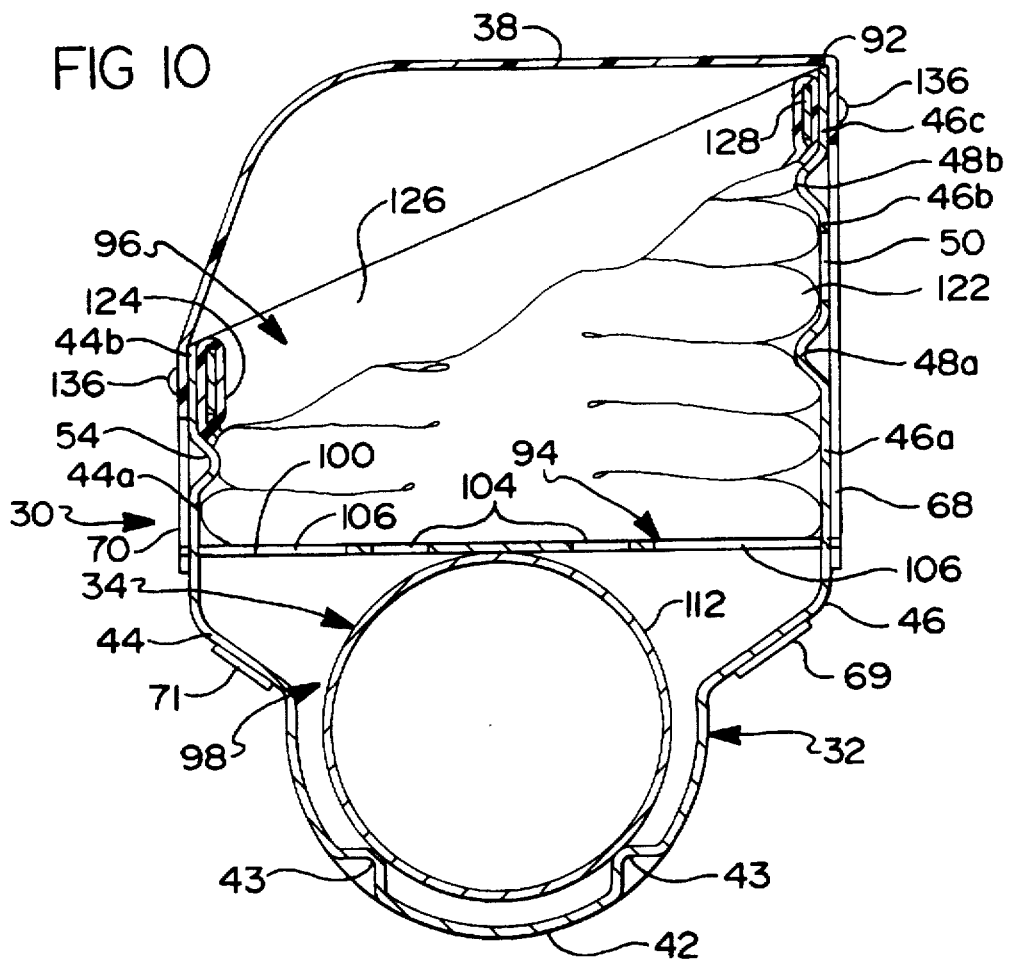
FIG. 10 is a sectional view which is taken along line 10—10 of FIG. 2.

Container 32 is shown in detail in FIGS. 4 and 10. It comprises a main body 40 having a generally elongated, open-ended U shape. A curved bottom wall 42 includes a pair of spaced stamped ribs 43 and flares outwardly into diverging short and tall side walls 44 and 46. Tall side wall 46 has vertical segments 46a, 46b and 46c interconnected by vertically-spaced longitudinal ribs 48a and 48b. Tall side wall segment 46b contains a series of spaced aspiration holes 50 lying between ribs 48a, 48b. Top wall segment 46c includes a series of spaced mounting holes 52.

Short side wall 44 includes lower and upper segments 44a and 44b separated by a longitudinal rib 54. Segment 44b includes a series of mounting holes 56. Ribs 48a 48b and 54 give rigidity to the side walls 44, 46.

One open end of main body 40 is partially closed by an end wall 58, while the other end is completely closed by end wall 60. End wall 58 has an arcuate opening 62 bordered by retention fingers 64 that are defined by radial slots 66 and include end serrations, as shown in FIG. 8. Retention fingers 64 extend slightly into opening 62 to retain inflator 34, as will be later described. End wall 58 includes bent attachment tabs 68, 69, 70 and 71 which embrace and are welded to side walls 44 and 46. A mounting bracket 72 is riveted or bolted to end wall 58.

End wall 60 includes a depression 74 and bent attachment tabs 76, 78, 80, 82, 84, 86 and 87 which are welded to main body bottom and side walls 42, 44 and 46. A mounting bracket 88 is welded, riveted or bolted to end wall 60. A bracket 89 is welded to the inside of end wall 60 over depression 74 and includes a vertical retention and orientation opening 90 flanked by serrated spring tabs 91 created by slots 91a and 91b, as shown in FIG. 7. As also shown in FIG. 7, the spring tabs 91 each have a shape which has a constant dimension directly adjacent the retention ends 91c and which is outwardly tapered at a location spaced away from the serrated retention ends 91c. The opening 90 has a generally constant width between the retention ends 91c of the spring tabs 91. Preferably, the serrated springs tabs 91 each include a plurality of serrations, preferably being at least four.

Referring now to FIGS. 3 and 4, when end walls 58 and 60 are assembled to main body 40 to create container 32, side walls 44 and 46 and end walls 58 and 60 define an upper rectangular air bag deployment opening 92. An intermediate support plate 94 is installed in container 32 and divides it into an upper air bag chamber 96 and a lower inflator chamber 98 across a lower gas transfer opening 100.

Support plate 94 comprises a main body 102 having three series of gas transfer holes 104. Four arms 106 extend from body 102 and terminate in mounting tabs 108 that are received in slots 110 in container side walls segments 44a and 46a. Gas from inflator 34 can freely flow from inflator chamber 98 into air bag chamber 96 through gas transfer opening 100 via gas transfer holes 104 and the large openings between support plate arms 106. As shown in FIG. 3, the series of aspiration holes 50 border one side of upper air bag chamber 96.

Air bag inflator 34 has cylindrical casing or body 112 which houses a conventional gas generating substance and igniter. Inflator 34 is directional in that casing 112 has a plurality of gas discharge holes 114 only along one side. Casing 112 is closed at one end by a circular cap 116 which carries electrical wiring 118 for the igniter. At its other end, casing 112 mounts a retention and orientation lug 120, which is in the form of a vertical blade having a tapered end, best seen in FIG. 6.

Figure 5:
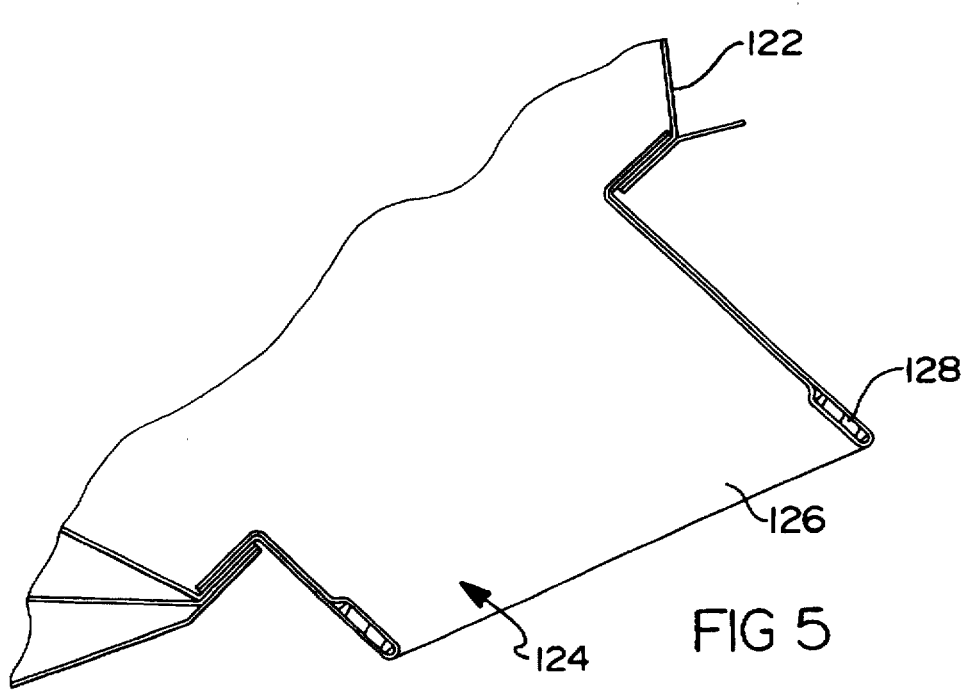
FIG. 5 is a detail of the air bag used in the module of FIGS. 2 and 3.

As shown in FIGS. 3 and 5, air bag assembly 36 comprises an air bag 122 having an inflation opening 124 bounded by a hem 126. An air bag retainer ring 128 is sewn into hem 126 and both contain a plurality of mating mounting holes 130 spaced along their sides. Cover 38 includes side flanges flaps 132.

Assembly of air bag module 30 is as follows. Container 32 is a subassembly manufactured by forming and assembling main body 40, end walls 58 and 60, support plate 94, bracket 89, and end mounting brackets 72 and 88. Support plate arm tabs 108 are bent over side wall segments 44a and 46a to provide added lateral strength to container 32. To create air bag assembly 36, air bag 122 is sewn out of a plurality of panels, retainer ring 128 is applied about inflation opening 124 and is sewn into hem 126. Air bag 122 is then pushed through opening 124 and folded.

Air bag assembly 36 is then inverted and inserted within opening 92 atop ribs 48b and 54, as shown in FIG. 10. This aligns mounting holes 130 with mounting holes 52 and 56. The folded air bag 122 lies atop support plate 94. Cover 38 is placed over opening 92 and side flaps 132 are folded down over container sides 44 and 46 to align holes 134 with holes 130, 52 and 56. Fasteners such as rivets 136 are applied through the aligned holes to secure the cover 38, air bag assembly 36 and container 32 together as a subassembly, which can be transported and stored without disassembling.

When it is desired to mate inflator 34 to this subassembly, body 112 is inserted lug end first through opening 62. Cylindrical body 112 will encounter and slide over ribs 43 until lug 120 enters opening 90. Opening 90 is slightly narrower than lug 120 so that insertion causes rearward deflection of serrated tabs 91, as illustrated in FIGS. 6 and 7. When inserted, lug 120 is gripped by tabs 91 and retained against removal. Any attempted removal would cause the serrations in the ends of tabs 91 to dig into the sides of lug 120. This alone retains inflator 34 in container 32 against removal. The complementary shapes of opening 90 and lug 120 assures proper orientation of inflator 34 within container 32, with gas discharge holes 114 facing gas discharge opening 100.

When inserted, inflator end cap 116 is complementarily shaped and sized to fill opening 62. Since retention fingers 64 project slightly into opening 62, insertion of end cap 116 will cause inward deflection of spring fingers 64, as shown in FIG. 9. An attempted removal of inflator 34 will cause the serrations in the ends of fingers 64 to grip end cap 116, preventing inflator removal. Thus, spring fingers 64 aid spring tabs 91 in retaining inflator 34 in air bag module 30 without the use of any additional rivets, bolts or other fasteners. By so doing, assembly is simplified.

When assembled, air bag module 30 will appear as shown in FIG. 2. The inner end of inflator 34 lies atop ribs 43, spaced from bottom wall 42. The stepped configuration of end cap 116 spaces the cap end of inflator 34 from bottom wall 42. Folded air bag 122 lies atop support plate 94, just above inflator 34. Air bag module 30 is mounted in a vehicle by attaching mounting brackets 72 and 88 to the support structure for instrument panel 20, not shown.

Operation will now be explained with particular reference to FIGS. 10–15. Just prior to actuation of inflator 34 by a signal from a vehicle-mounted deceleration detector (not shown) through wiring 118, air bag module 30 is as depicted in FIG. 10, with cover door 28 closing deployment opening 26.

Upon actuation, inflator 34 rapidly discharges pressure gas through discharge holes 114. The gas flows upwardly through gas transfer holes 104 and around arms 106 of support plate 94 and against the bottom folds of air bag 122, as illustrated in FIG. 11. Air bag 122 begins filling and unfolding back through inflation opening 124, as shown in FIG. 12. Air bag 122 bursts through cover 38 and presses against the bottom of cover door 28, which resists, as pressure rises rapidly.

As pressure rises, the fabric of air bag 122 will compress against cover door 28. This exposes aspiration holes 50, which momentarily operate in reverse to exhaust gas. This limits the pressure in air bag 122 and the consequent force on cover door 28, which will quickly break open. This exposure of aspiration holes (FIG. 13) reduces the force exerted by cover door 28 on restraining straps, if used, or on whatever part of the vehicle interior it strikes, lessening the chance that breakage will occur. It also reduces the force exerted to an occupant who is out of normal seating position.

Upon opening of cover door 28, air bag 122 will deploy rapidly through opening 26 and develop considerable inertia. This rapid deployment causes a pressure drop in container 32 as air bag 122 deploys faster than inflator 34 can discharge gas. Consequently, aspiration holes 50 begin to aspirate ambient air to assist in filling air bag 122, as shown in FIG. 14.

When air bag 122 engages a vehicle occupant during deployment (not shown), pressure will rise quickly above a predetermined amount. This immediately pressurizes container 32. Since aspiration holes 50 are uncovered, pressure relief is immediate, as gas is vented out holes 50 to reduce pressure, as shown in FIG. 15, and provide a predetermined "ridedown" for the passenger. Upon deactuation of inflator 34, air bag 122 can be easily collapsed by venting the air/inflating gas mixture through aspirator holes 50. This eliminates the need for vent holes in the air bag, which are frequently provided for that purpose.

Upon actuation, inflator 34 ignites and combusts chemicals to generate inflation gas. This combustion generates high temperatures in inflator casing 112. Since casing 112 is spaced from container bottom wall 42 by an air pocket, container 32 is insulated and never reaches a temperature injurious to neighboring materials within instrument panel 20.

Thus, this invention provides a simplified air bag module which uses a directional inflator that enables the augmentation of discharge gas by aspiration of ambient air, provides an air bag module of simplified construction which provides relief for excessive air bag pressure, and provides an air bag module which supplies initial high air bag pressure to initiate air bag breakout immediately followed by a momentary pressure reduction to reduce the breakout forces, followed by aspiration to augment discharge gas during air bag deployment.

While only a preferred embodiment has been illustrated and described, obvious modifications thereof are contemplated within the scope of the invention and the following claims.

What is claimed is:

1. An air bag module comprising:

an air bag;

a container including spaced apart end walls;

an elongated inflator extending between the end walls and for discharging gas to inflate the air bag, the inflator having an inflator end;

a lug projecting outwardly from the inflator end, the lug for engaging one of the end walls of the container; and first and second opposing spring tabs on the one end wall of the container, the spring tabs each including a retention end, the retention ends being spaced apart from each other and defining a retention opening therebetween, the retention opening being narrower than the lug on the inflator end, the retention opening having a generally constant width such that the retention ends are shaped and positioned for maximum interengagement with the inflator lug, the retention ends each including a plurality of adjacent serrations for biting into the inflator lug when inserted through the opening;

whereby upon insertion of the lug into the retention opening, the lug engages the retention ends of the spring tabs and deflects the spring tabs such that the retention ends of the spring tabs each grip against the lug to cooperatively capture the lug between the spring tabs and prevent removal of the inflator from the container.

2. The air bag module of claim 1 wherein each of the spring tabs is outwardly tapered at a location spaced apart from the respective retention end.

3. The air bag module of claim 1 wherein the serrations of the retention ends each include at least four, closely spaced serrations for biting engagement with the inflator lug.

4. The air bag module of claim 1 wherein the one end wall includes a bracket and the spring tabs are located on the bracket.

5. The air bag module of claim 1 wherein the lug is generally flat and blade-shaped and includes a tapered end.

6. The air bag module of claim 1 wherein each of the spring tabs is shaped to have a constant dimension adjacent the retention ends and to have an increasing outwardly tapered dimension at a location spaced apart from the retention ends.

7. An air bag module comprising:

an air bag;

a container including longitudinally elongated and laterally opposed side walls, a bottom wall, and end walls interconnecting the side walls and defining an upper air bag deployment opening;

a longitudinally elongated inflator for discharging gas to inflate the air bag and having an inflator end;

a generally flat blade-shaped lug extending longitudinally outwardly from the inflator, the lug having a tapered end, the lug for engaging one of the end walls of the container;

the one end wall of the container including a first slot, a second slot spaced apart from the first slot, and a retention opening normal to and extending between the first and second slots, the retention opening for receiving the lug on the inflator therein and being sized narrower than the lug on the inflator; and first and second opposing spring tabs cooperatively defined by the first slot, second slot and retention opening, the spring tabs each having a retention end facing the retention opening;

the retention opening having a generally constant width such that the retention ends are shaped and positioned for maximum interengagement with the inflator lug, the retention ends each including a plurality of adjacent serrations for biting into the inflator lug when inserted through the opening;

whereby upon insertion of the lug into the retention opening the lug deflects the first and second spring tabs and the retention ends of the spring tabs each grip against the lug to cooperatively capture the lug between the spring tabs and prevent removal of the inflator from the container and to orient the inflator relative the container.

8. The air bag module of claim 7 wherein the serrations of the retention ends of the first and second spring tabs include at least four closely spaced serrations.

9. The air bag module of claim 7 wherein each of the spring tabs is shaped to have a constant dimension adjacent the retention ends and to have an increasing outwardly tapered dimension at a location spaced apart from the retention ends.

* * * * *